(12) United States Patent
Gandhi

(10) Patent No.: US 8,452,494 B2
(45) Date of Patent: May 28, 2013

(54) METHOD AND SYSTEM FOR IMPROVING CURTAIN AIR BAG DEPLOYMENT USING AN ACTUATOR ATTACHED TO A HEADLINER

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 338 days.

(21) Appl. No.: 12/796,381

(22) Filed: Jun. 8, 2010

(65) Prior Publication Data
US 2011/0301816 A1    Dec. 8, 2011

(51) Int. Cl.
*B60R 21/16* (2006.01)

(52) U.S. Cl.
USPC ........ 701/45; 280/730.2; 280/735; 280/728.3

(58) Field of Classification Search
USPC ........ 701/45; 280/730.2, 735, 728.3; 180/274
See application file for complete search history.

(56) References Cited

U.S. PATENT DOCUMENTS

| | | | |
|---|---|---|---|
| 5,645,136 A * | 7/1997 | Byon | 180/274 |
| 6,193,303 B1 | 2/2001 | Urushiyama et al. | |
| 6,257,616 B1 | 7/2001 | Nowak et al. | |
| 6,588,793 B2 * | 7/2003 | Rose | 280/728.2 |
| 7,140,636 B2 | 11/2006 | DePue et al. | |
| 7,372,348 B2 | 5/2008 | Xu et al. | |
| 7,500,693 B2 | 3/2009 | Guth et al. | |
| 2005/0173907 A1 | 8/2005 | Welford | |
| 2006/0125291 A1 | 6/2006 | Buravalla et al. | |
| 2007/0228702 A1 | 10/2007 | Ono et al. | |
| 2009/0206581 A1 | 8/2009 | Lawall et al. | |
| 2009/0218794 A1 | 9/2009 | Melz et al. | |

FOREIGN PATENT DOCUMENTS

JP     2005-145112     6/2005

* cited by examiner

*Primary Examiner* — Thomas Tarcza
*Assistant Examiner* — Maceeh Anwari
(74) *Attorney, Agent, or Firm* — Snell & Wilmer LLP

(57) ABSTRACT

The present invention is a method and system for improving curtain air bag deployment using an actuator attached to a headliner. The present invention can include an automobile having a roof, a headliner, an actuator, a curtain air bag, a door, a sensor, and/or a processor. The roof can also include a roof rail. The roof rail and the headliner enclose the curtain air bag. The actuator is attached to the headliner. The sensor is located within the door and detects collision data. The processor analyzes the collision data to determine when to deploy the curtain airbag. In deploying the curtain airbag, the processor activates the actuator, which reduces the overlap between the headliner and the roof rail. The curtain airbags deploys by either pushing through the reduced overlap between the headliner and the roof rail or by easily forming through a gap between the headliner and the roof rail.

20 Claims, 6 Drawing Sheets

METHOD AND SYSTEM FOR IMPROVING CURTAIN AIR BAG DEPLOYMENT USING AN ACTUATOR ATTACHED TO A HEADLINER

BACKGROUND

1. Field

The present invention relates to a method and system for improving curtain air bag deployment using an actuator attached to a headliner.

2. Description of the Related Art

A conventional automobile includes a curtain airbag enclosed within a roof rail and a headliner. The roof rail and the headliner overlap each other. The automobile generally deploys the curtain airbag in response to a collision. To deploy the curtain airbag the curtain airbag is filled with gas and the expanding curtain airbag applies pressure to the overlap between the roof rail and a headliner. The application of pressure by the curtain airbag reduces the overlap between the roof rail and the headliner to allow the curtain airbag to deploy between the roof rail and the headliner. However, this may require the overlap between the roof rail and the headliner to be minimized or to be incredibly precise. In addition, the headliner would generally be from more flexible material, which may be undesirable.

Thus, there is a need for a method and system for improving curtain air bag deployment using an actuator attached to a headliner.

SUMMARY

In one embodiment, the present invention is a method and system for improving curtain air bag deployment using an actuator attached to a headliner. In one embodiment, the present invention can include an automobile. The automobile can include, for example, a roof, a headliner, an actuator, a curtain air bag, a door, a window, a sensor, a processor, and/or a seat. The roof can also include a roof rail. The roof rail and the headliner enclose the curtain air bag. The actuator is also attached to the headliner. The headliner and the actuator can form an adaptive headliner. The sensor can be located within the door and can detect collision data.

The processor can analyze the collision data and determine whether a collision has occurred and whether to deploy the curtain airbag or not. In deploying the curtain airbag, the processor activates the actuator which reduces the overlap between the headliner and the roof rail. The processor instructs the curtain airbag to deploy and the curtain airbag is deployed by either pushing through the reduced overlap between the headliner and the roof rail or by forming through a gap between the headliner and the roof rail. This reduces the likelihood of any irregularities in the deployment of the curtain airbag and/or also allows the headliner to be formed from a stiffer material. The deployment of the curtain airbag can allow a user in the seat to be safely protected, for example, from damage to the window.

In one embodiment, the present invention is an air bag deployment system including a headliner, a roof rail overlapping the headliner, a curtain air bag located between the headliner and the roof rail, and an actuator connected to the headliner, the actuator configured to reduce an overlap between the headliner and the roof rail when activated.

In another embodiment, the present invention is an automobile including a headliner, a roof rail overlapping the headliner, a curtain air bag located between the headliner and the roof rail, an actuator connected to the headliner and including a shape memory alloy strip and an outer metallic plate, the actuator configured to reduce an overlap between the headliner and the roof rail when activated, and a processor connected to the actuator and configured to activate the actuator prior to deployment of the curtain air bag or during the deployment of the curtain air bag.

In yet another embodiment, the present invention is a method for deploying a curtain airbag including determining a collision to a side door, activating an actuator to decrease an overlap between a roof rail and a headliner, and deploying the curtain airbag.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Figure 1:
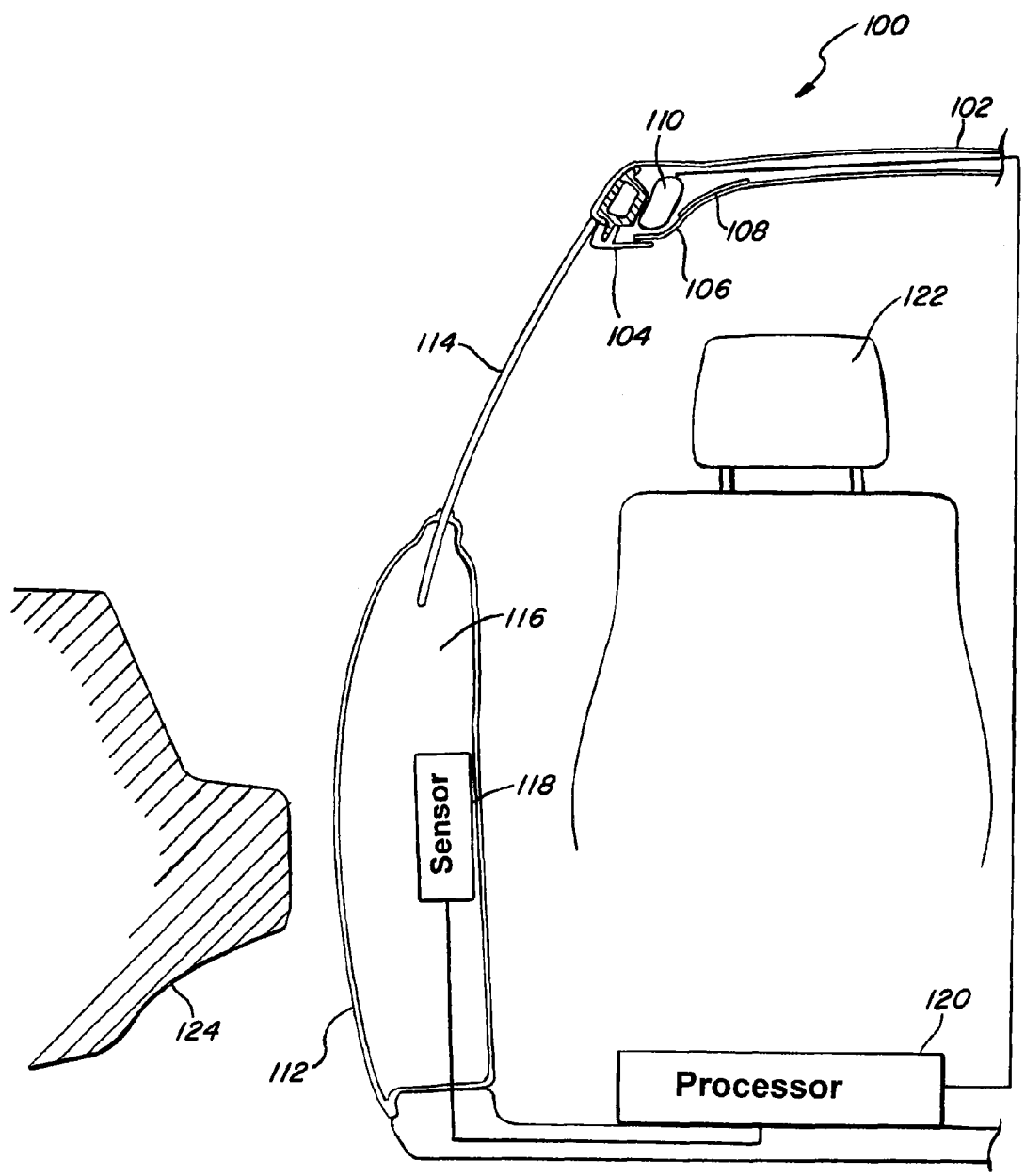
FIG. 1 depicts an automobile including an adaptive headliner according to an embodiment of the present invention.

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

In one embodiment, the present invention includes, for example, an automobile 100. The automobile 100 can be, for example, any vehicle with any type of engine and/or motor which can transport a person from one location to another location. The automobile 100 includes, for example, a roof 102, a headliner 106, an actuator 108, a curtain air bag 110, a door 112, a window 114, a sensor 118, a processor 120, and/or a seat 122.

The seat 122 can be configured to hold a user, such as a person. The door 112 can be, for example, a side door and can include, for example, an interior portion 116 which houses the sensor 118. The sensor 118 can be used, for example, to detect an impact to the door 112 from an object 124.

The roof 102 can include, for example, the roof railing 104. The roof railing 104 and the headliner 106 form an enclosure for the curtain air bag 110. The curtain air bag 110 can be deployed through a junction between the roof railing 104 and the headliner 106. The curtain air bag 110 can be deployed, for example, by the processor 120 when the sensor 118 indicates that there is an impact to the door 112 from the object 124.

The processor 120 receives collision data from the sensor 118 and determines when to deploy the curtain air bag 110. The processor 120 can be, for example, an engine control unit ("ECU"). The processor 120 can analyze, for example the collision data to determine whether a sufficient impact has occurred for the curtain airbag 110 to deploy. For example, during low speed collisions, the processor 120 may not instruct the curtain air bag 110 to deploy, or instruct the curtain air bag 110 to not deploy. However at high speed collisions, the processor 120 may instruct the curtain air bag 110 to deploy.

The actuator 108 is attached, for example, to the headliner 106 and/or the processor 120 and reduces or eliminates an overlap between the roof rail 104 and the headliner 106. In one embodiment, the headliner 106 can be, for example, an adaptive headliner and can include the actuator 108. In another embodiment, the headliner 106 and the actuator 108 can for, for example, an adaptive headliner. When the sensor 118 indicates that a collision has occurred, the processor 120 can activate the actuator 108, prior to deploying the curtain air bag 110. When activated, the actuator 108 reduces or eliminates the overlap between the roof rail 104 and the headliner 106 by moving, for example, the headliner 106. The actuator 108 can also create a gap between the roof rail 104 and the headliner 106 by moving, for example, the headliner 106.

In one embodiment, the actuator 108 can create a gap between the roof rail 104 and the headliner 106 prior to full deployment of the curtain air bag 110. Although the actuator 108 is shown attached to the headliner 106, the actuator 108 can also be attached to the roof rail 104. In addition, multiple actuators may be used with some or all of the actuators being attached to the headliner 106 and/or the roof rail 104.

By reducing or eliminating the overlap between the roof rail 104 and the headliner 106, the actuator 108 improves the likelihood of the curtain air bag 110 being successfully deployed without any irregularities. In addition, by reducing or eliminating the overlap between the roof rail 104 and the headliner 106, the curtain air bag 110 can also be deployed in a quicker manner. Furthermore, the use of the actuator 108 can allow flexibility in the design of the headliner 106. For example, a stiffer headliner 106 to be used, since the force of the curtain airbag 110 will not be the only force used to separate the overlap between the roof rail 104 and headliner 106. The stiffer headliner 106 can improve the structural integrity of the automobile 100. In addition, the headliner 106 can also be formed to be a variety of different shapes, be formed from various different materials, or be packaged in a variety of manner due to the use of the actuator 108.

Figure 2:
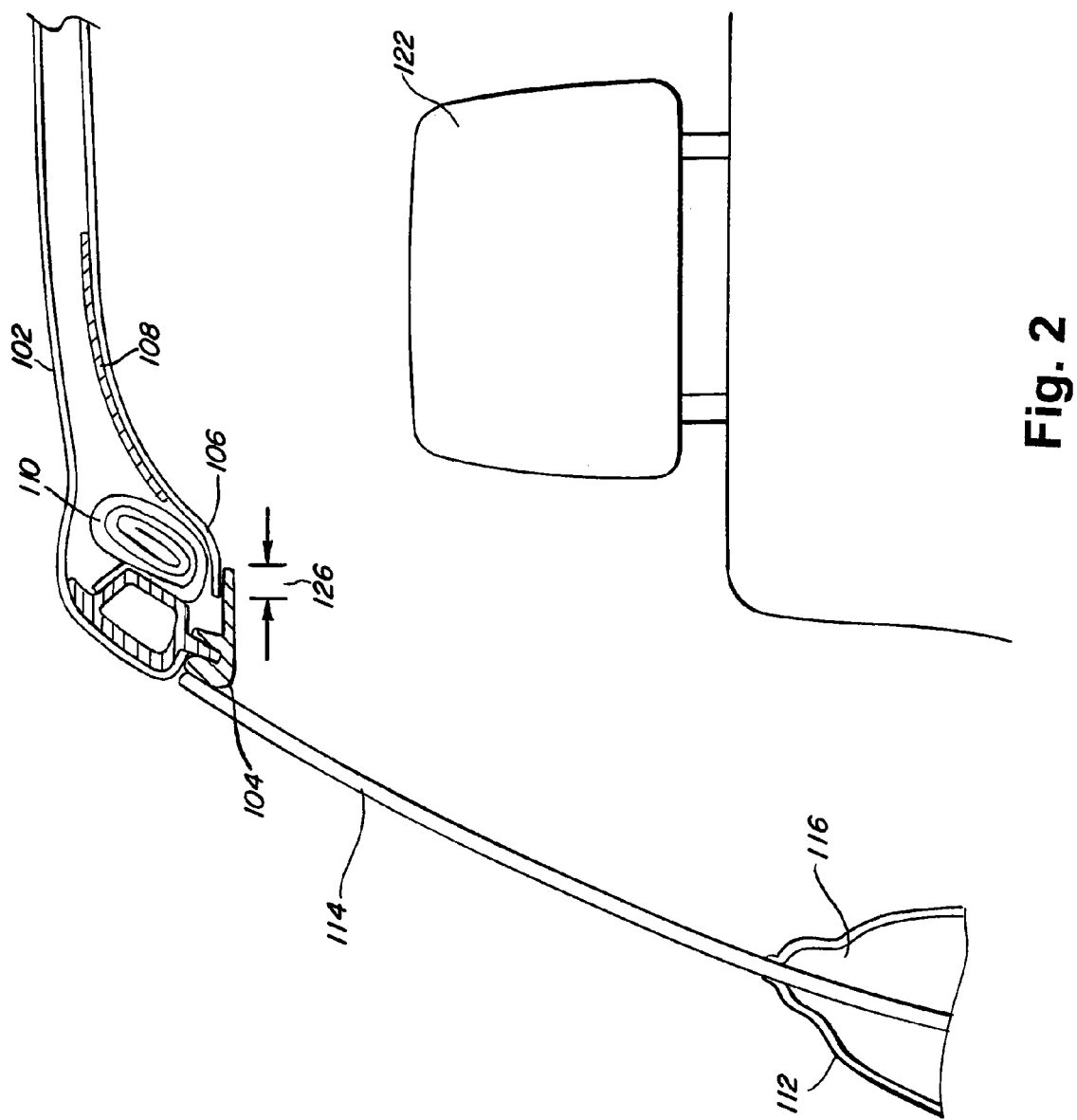
FIG. 2 depicts an automobile including an adaptive headliner according to an embodiment of the present invention.
Figure 3:
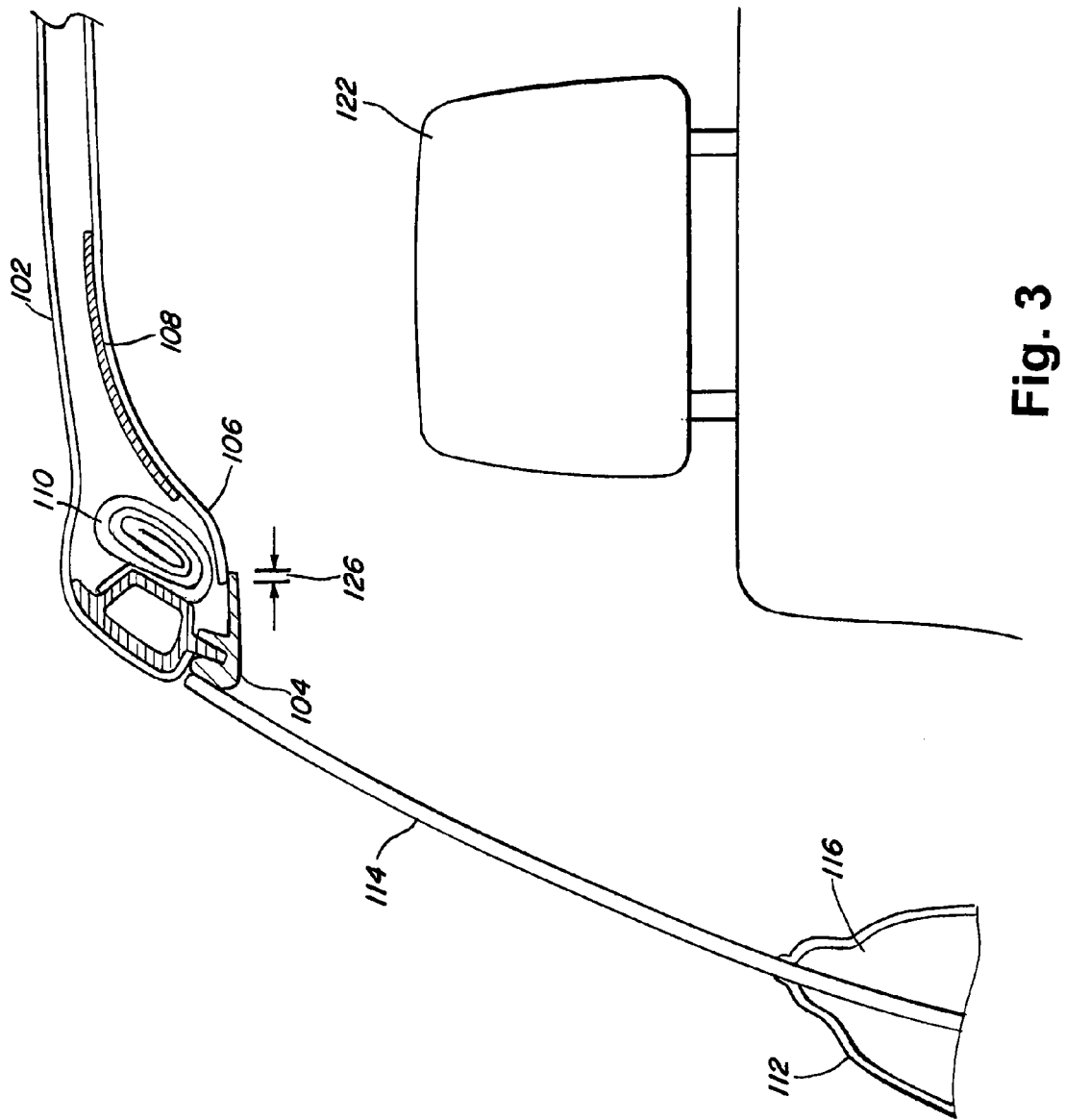
FIG. 3 depicts an automobile including an adaptive headliner according to an embodiment of the present invention.
Figure 4:
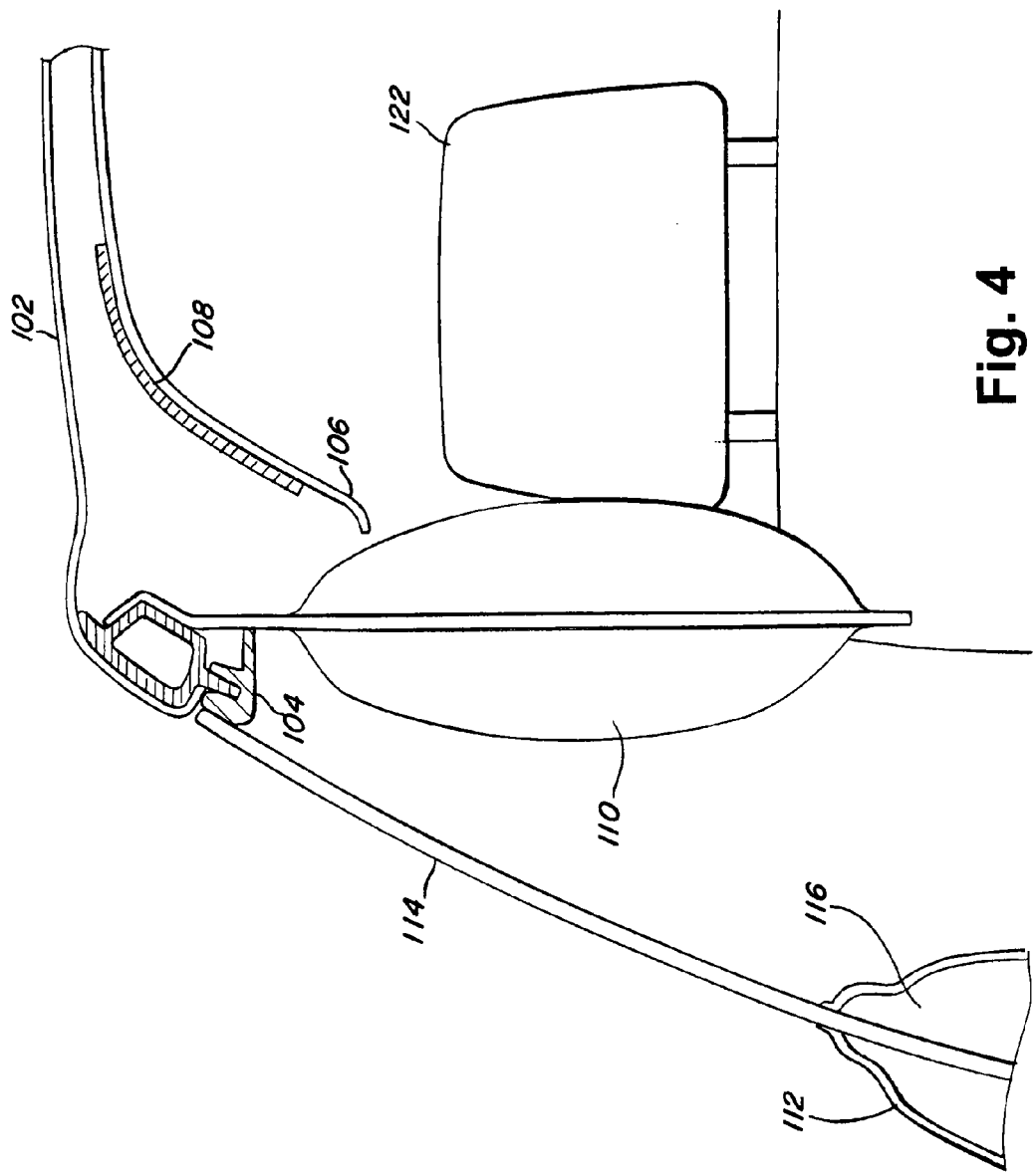
FIG. 4 depicts an automobile including an adaptive headliner according to an embodiment of the present invention.

The operation of the actuator 108 and/or the curtain air bag 110 can be seen, for example, in FIG. 2, FIG. 3, and FIG. 4. As seen in FIG. 3, prior to activation of the actuator 108, the roof rail 104 and the headliner 106 overlap by an overlap distance 126. However, in FIG. 4, when the actuator 108 is activated, the actuator 108 bends and moves the headliner 106. The actuator 108 moves the headliner 106 away from the roof rail 104, thus reducing the overlap distance 126. The reduction in the overlap distance 126 improves the ease with which the curtain air bag 110 is deployed.

The deployment of the curtain air bag 110 can be seen, for example, in FIG. 4. The curtain air bag 110 can protect the user in the seat 122 by providing a cushion for the user. In one embodiment, the curtain airbag 110 can be deployed, for example, after the actuator 108 has been activated. However, the curtain airbag 110 may not need to wait until the actuator 108 is fully bent, but instead can begin to fill with gas in preparation for deployment in order to reduce deployment time of the curtain airbag 110.

Figure 5:
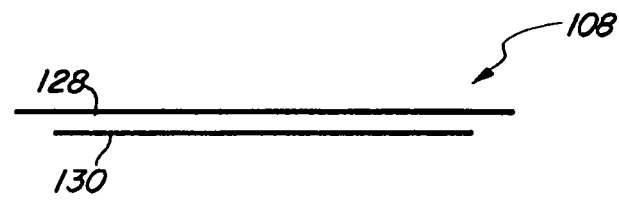
FIG. 5 depicts an adaptive headliner according to an embodiment of the present invention.
Figure 6:
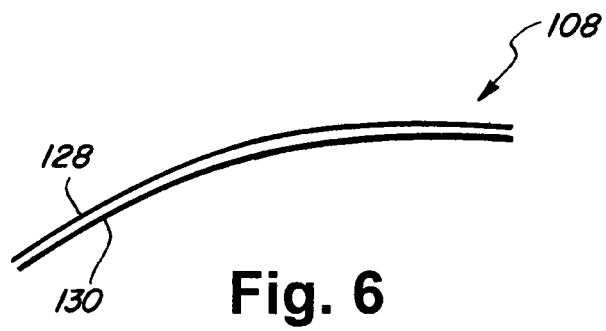
FIG. 6 depicts an adaptive headliner according to an embodiment of the present invention.
Figure 7:
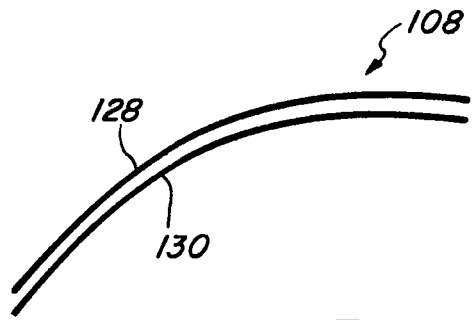
FIG. 7 depicts an adaptive headliner according to an embodiment of the present invention.

A more specific description of the operation of the actuator 108 can be seen, for example, in FIG. 5, FIG. 6, and FIG. 7. In one embodiment, the actuator 108 includes an outer metallic plate 128 connected to a shape memory alloy 130. The outer metallic plate 128 is notably longer than the shape memory alloy 130 so that the outer metallic plate 128 is in compression and the shape memory alloy 130 is in tension when connected together as shown in FIG. 6. Although the actuator 108 includes an outer metallic plate 128 and/or a shape memory alloy 130, other materials may be used which can reduce the overlap between the roof rail 104 and/or the headliner 106 in a quick and efficient manner.

When activated, the actuator 108 bends. This is accomplished by heating the shape memory alloy 130. The shape memory alloy 130 can be heated, for example, in 5-7 ms using an electric source. When the shape memory alloy 130 is heated, it contracts by 1-5%. The outer metallic plate 128, however, does not contract from the heat. Thus, the contraction of the shape memory alloy 130 bends the outer metallic plate 128, resulting in the bending of the actuator 108, as seen in FIG. 7.

Figure 8:
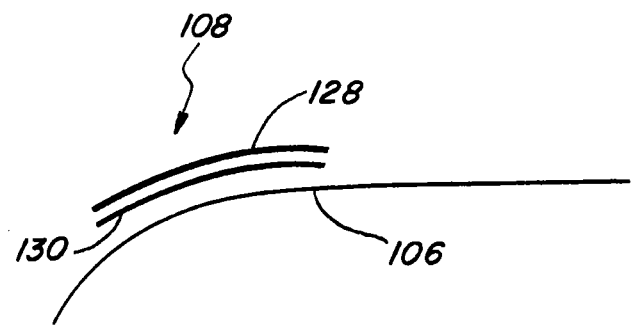
FIG. 8 depicts an adaptive headliner operating on a headliner according to an embodiment of the present invention.

As seen in FIG. 8, when the actuator 108 bends, the headliner 106 is also bent. The bending of the headliner 106 strategically moves it away from the roof rail 104, reducing the overlap between the roof rail 104 and the headliner 106, or creating a gap between the roof rail 104 and the headliner 106. This allows for an easy deployment of the curtain air bag.

Figure 9:
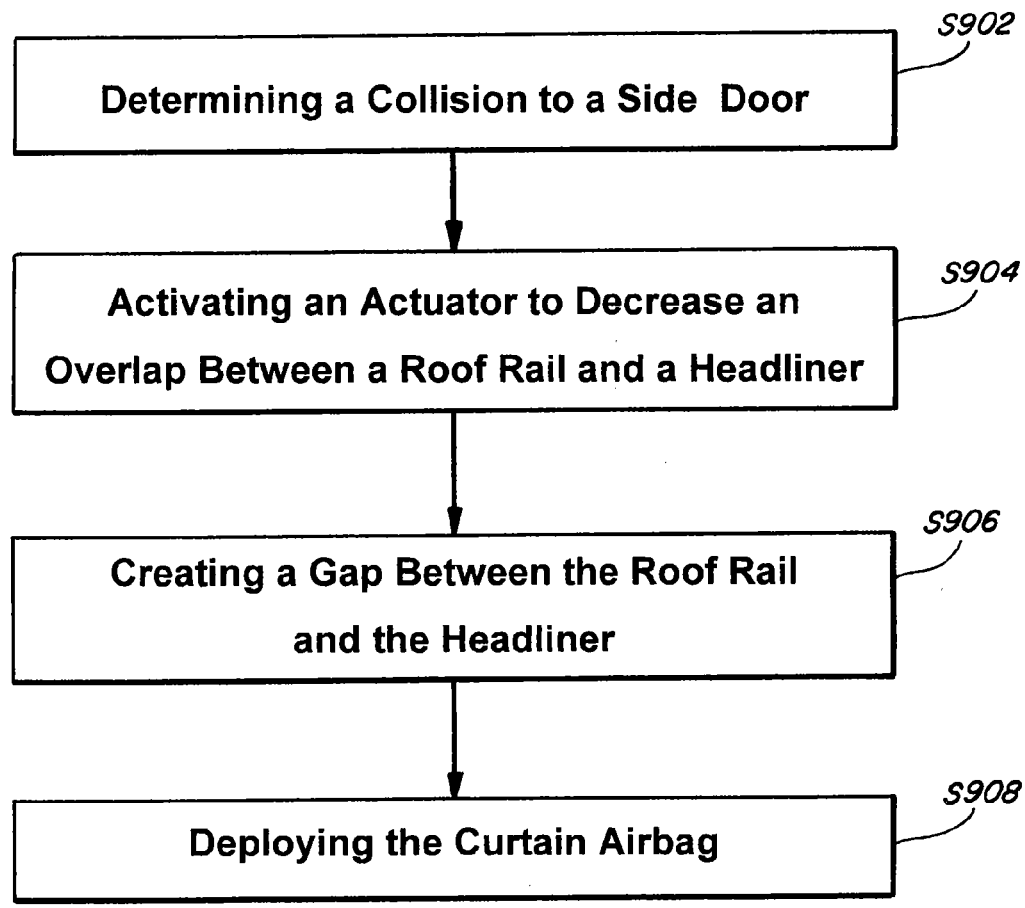
FIG. 9 depicts a process according to an embodiment of the present invention.

In one embodiment, the present invention is a process, as shown in FIG. 9. As seen in FIG. 9, in Step S902, a determination is made as to whether there is a collision to a side door. For example, the sensor 118 can detect collision data, which the processor 120 can analyze to determine whether there is a collision to the side door 112. In Step S904, an actuator is activated to decrease an overlap between a roof rail and a headliner. For example, the actuator 108 is activated to decrease the overlap 126 between the roof rail 104 and the headliner 106 as seen in FIG. 3. The actuator 108 can be activated, for example, by heating the shape memory alloy 130 to bend the outer metallic plate 128 as seen in FIG. 6 and FIG. 7.

In Step S906, a gap is created between the roof rail and the headliner. For example, the actuator 108 can move the headliner 106 so that a gap is created between the roof rail 104 and the headliner 106. In Step S908, the curtain airbag is deployed. For example, the processor 120 can instruct the curtain airbag 110 to deploy. The curtain airbag 110 can deploy, for example, through the gap between the roof rail 104 and the headliner 106 as seen in FIG. 4.

In one embodiment, the sensor 118 can detect collision data for approximately 8 ms to 9 ms after the first impact of the door 112. At approximately 10 ms to 11 ms after the first impact of the door 112, the processor 120 can complete analysis of the collision data and determine whether to deploy the curtain airbag 110 or not. At approximately 11 ms after the first impact of the door 112, the processor 120 can activate the actuator 108 so that the overlap between the roof rail 104 and the headliner 106 is reduced. At approximately 15 ms to 17 ms after the first impact of the door 112, the curtain airbag 110 can commence deployment. At approximately 30 ms to 40 ms after the first impact of the door 112, the curtain airbag 110 can be fully deployed.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An air bag deployment system comprising:
   a roof rail;
   a headliner overlapping the roof rail;
   a curtain air bag located adjacent to the headliner and the roof rail;
   an actuator that is in direct contact with the headliner; and
   a heating device configured to heat the actuator when the heating device is activated, the heat causing the actuator to bend or contract, which moves and bends the headliner to reduce an overlap between the headliner and the roof rail.

2. The system of claim 1 wherein the actuator includes a shape memory alloy strip.

3. The system of claim 2 wherein the actuator includes an outer metallic plate.

4. The system of claim 3 wherein the shape memory alloy strip contracts and bends the outer metallic plate when the heating device heats the actuator.

5. The system of claim 1 wherein the actuator bends the headliner to create a gap between the headliner and the roof rail when the heating device heats the actuator.

6. The system of claim 5 wherein the heating device is activated prior to deployment of the curtain air bag.

7. The system of claim 1 further comprising a processor configured to activate the heating device prior to or during the deployment of the curtain air bag.

8. The system of claim 7 wherein when the heating device heats the actuator, the actuator bends and pushes the headliner away from the roof rail.

9. The system of claim 7 further comprising a sensor located on a side door of an automobile, the sensor detecting collision data.

10. The system of claim 9 wherein the processor activates the heating device based on the collision data.

11. The system of claim 7 wherein when the heating device heats the actuator, the actuator creates a gap between the headliner and the roof rail.

12. An automobile comprising:
    a roof rail;
    a headliner overlapping the roof rail;
    a curtain air bag located adjacent to the headliner and the roof rail;
    an actuator in direct contact with the headliner and including a shape memory alloy strip and an outer metallic plate;
    a heating device configured to heat the actuator when the heating device is activated, the heat causing the actuator to bend or contract, which moves and bends the headliner to reduce an overlap between the headliner and the roof rail; and
    a processor connected to the heating device and configured to activate the heating device prior to or during the deployment of the curtain air bag.

13. The automobile of claim 12 further comprising:
    a side door located on a same side as the curtain air bag in the automobile; and
    a sensor connected to the processor and located within the side door, the sensor configured to detect collision data for the side door, and wherein the processor activates the heating device based on the collision data.

14. The automobile of claim 12 wherein the shape memory alloy strip contracts and bends the outer metallic plate when the heating device heats the actuator.

15. The system of claim 12 wherein the actuator bends the headliner to create a gap between the headliner and the roof rail when the heating device heats the actuator.

16. The system of claim 15 wherein the curtain air bag is deployed after the actuator creates the gap between the headliner and the roof rail.

17. A method for deploying a curtain airbag comprising:
   determining, using a sensor positioned within a side door and coupled with a processor, a collision to the side door;
   activating, using the processor, a heating device;
   applying heat, using the heating device, to an actuator in direct contact with a headliner to decrease an overlap between a roof rail and the headliner; and
   deploying the curtain airbag.

18. The method of claim 17 wherein the curtain airbag is deployed after the heating device is activated.

19. The method of claim 17 wherein the actuator creates a gap between the headliner and the roof rail after the heating device is activated.

20. The method of claim 19 wherein the curtain airbag is deployed after the actuator creates the gap between the headliner and the roof rail.

* * * * *